March 10, 1936.  G. W. HOUSDORFER  2,033,769
VENTILATOR MECHANISM FOR VEHICLES
Filed Aug. 2, 1933
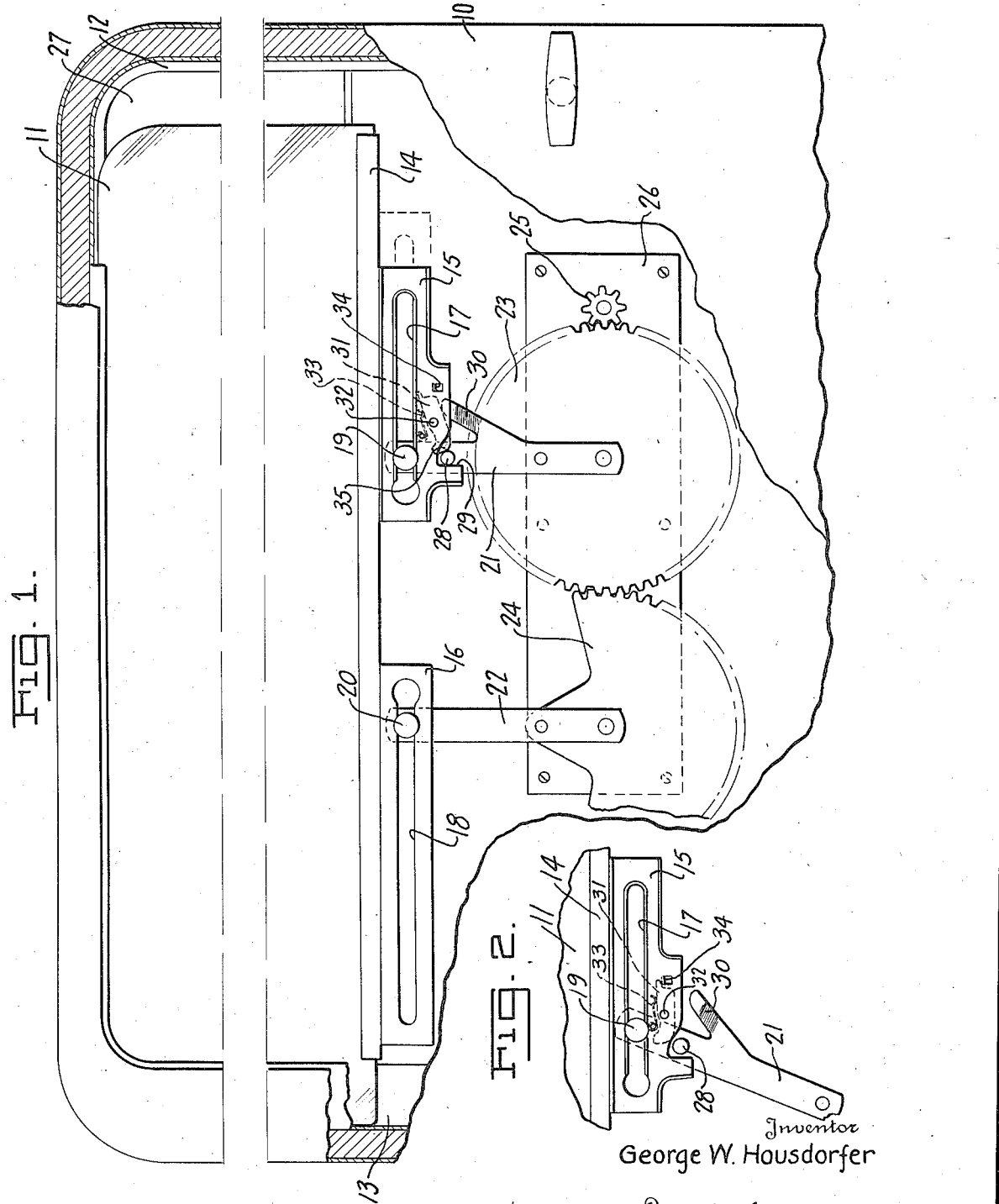
Inventor
George W. Housdorfer
By Owen & Owen
Attorneys Patented Mar. 10, 1936

2,033,769

UNITED STATES PATENT OFFICE 2,033,769

VENTILATOR MECHANISM FOR VEHICLES

George W. Housdorfer, Toledo, Ohio, assignor, by mesne assignments, to Automobile Ventilation, Inc., Detroit, Mich., a corporation of Michigan Application August 2, 1933, Serial No. 683,361

4 Claims. (Cl. 268—126)

This invention relates to vehicles, but particularly to the ventilation of vehicles by which air may be withdrawn from the inside of the vehicle, as by suction, when it is in motion, devices of this character being commonly referred to as "draftless ventilators".

An object of this invention is to produce a simple and efficient ventilator for a vehicle window in which the regulator mechanism therefor constitutes a self-contained unit or assembly (enabling it to be readily and conveniently installed as a unit in the door) for not only imparting vertical movements to the window, but transverse movements in the plane of the window when the latter is raised. This obviates the mounting of any auxiliary mechanism or parts on the door for cooperating with the regulator to effect the transverse movements to the window.

Other objects and advantages will hereinafter appear and for purposes of illustration an embodiment of the invention is shown in the accompanying drawing, in which—

Figure 1 is a vertical elevation partly in section of a portion of an automobile door equipped with my new window ventilator device showing the window moved transversely to provide the ventilating opening; and Figure 2 is an elevation showing one of the arms of the regulator and the rail with which it connects in a position which the parts assume as the window commences its downward movement.

The illustrated embodiment of the invention comprises a door 10 of an automobile or other similar vehicle having a window 11, which is mounted for vertical movements, opposite side edges thereof engaging in substantially U-shaped runways 12 and 13. The runway 13 adjacent the upper end portion thereof is relatively deep providing a well into which the window may be moved laterally or transversely in the plane of the window as will hereinafter appear.

Secured to the lower edge of the window 11 is a channel 14 from which depends rails 15 and 16, respectively. The rails 15 and 16 have horizontally elongate slots 17 and 18 respectively and projecting into these slots are buttons or rollers 19 and 20 carried respectively by regulator arms 21 and 22. The opposite ends of the regulator arms 21 and 22 are respectively fixed to gears 23 and 24, which mesh with each other, a pinion 25 engaging the gear 23 and adapted to be actuated by the usual regulator handle for actuating the gear. As shown, the gears 23 and 24 and pinion 25 are mounted on a plate 26 suitably secured to the door 10. It will be understood that the double arm regulator is old in the art and it operates by the swinging movement of the arms 21 and 22 and in cooperative relation between the buttons or rollers 19 and 20 and respective slots to effect raising and lowering of the window 11. Since this construction is well known to those skilled in this art, a detailed description and illustration thereof is deemed unnecessary for an intelligent understanding of this invention.

As will hereinafter appear, when the window 11 is in its raised or closed position, upon further actuation of the regulator in the same direction, transverse movement is imparted to the window 11 in the plane of the window to provide a ventilating opening 27 at the forward part of the door through which air and foul gases may be withdrawn from the inside of the vehicle by the suction created by the vehicle when the latter is moving forward. For this purpose, the regulator arm 21 is provided with a pin or lug 28 which abuts against a projection 29, which forms a part of and depends from the rail 15. It is apparent that upon counter-clockwise movement of the arm 21 the pin 28 engages the projection 29 and upon further movement thereof the window 11 is moved laterally into the relatively deep runway 13, thus to provide the ventilating opening between the front edge of the window and the runway 12. During this movement the regulator arm 22 moves in a clockwise direction, the slot 18 and the rail 16 being elongated sufficiently for this purpose. Thus it is apparent that the window 11 is positively moved laterally in the plane of the window by the same regulator which effects the raising and lowering of the window and by continuous movement in the same direction with the regulator handle.

Mechanism is also provided to enable the window 11 to be positively returned to normal position or to effect movement of the window 11 to the right of Fig. 1 to close or reduce the size of the ventilating opening 27. For this purpose a finger 30, preferably forming a part of the regulator arm 21, extends upwardly at an angle therefrom and also inwardly so that the outer end is disposed at the inner side of the rail 15. The finger 30 is adapted to bear against an arm 31, which is pivoted between its ends at 32 to the rail 15. A spring 33 normally holds the lever 31 in horizontal position retaining the lever in engagement with a lug 34 projecting laterally from the rail.

It will be apparent that as the regulator arm 21 swings in a counter-clockwise direction to raise the window 11 to closed position, the finger 30 will be brought into contact with the lever 31 and rock the same in a counter-clockwise direction to bring the opposite end of the lever in close juxtaposition to the pin 28. Thus the opposite end of the lever 31 is positioned close to the pin 28 and upon actuation of the arm 21 in the opposite or clockwise direction, the pin 28 bears against the adjacent end of the lever 31 and thereby effects transverse movement of the window 11 to return the same to closed or normal position, and in this manner positively returns the window 11 to closed position, closing off the ventilating opening 27.

It will be noted that the end of the lever 31 adjacent the pin 28 is upwardly curved, as indicated at 35. This allows the spring 33 to move the lever 31 abruptly to horizontal position as soon as released by the finger 30. Consequently, as the window moves downwardly, the lever 31 is disposed in horizontal position and out of the arcuate path of movement of the pin 28.

A cardinal advantage of this construction is that it is a self contained unit or assembly and does not require any cooperating part or parts on the door itself. From the standpoint of assembly this is of importance since the regulator can be mounted in the door without requiring the installation of other parts on the floor with which the regulator parts coact. Obviously, in large scale production this is a valuable feature, since the regulator mechanism can be supplied separately and readily and conveniently installed on the doors without the necessity of adjusting parts secured to the door.

It is to be understood that numerous changes in details of construction, arrangement and operation may be effected without departing from the spirit of the invention, especially as defined in the appended claims.

What I claim is:

1. In a vehicle door having a window, a rail having a horizontal slot secured to the lower edge of the window, a regulator for raising and lowering said window including a pair of swinging arms one thereof having an element movable along said slot, a pair of horizontally spaced abutments on said rail, and a separate member movable with said last named arm and engageable with one abutment for moving the window edgewise when in raised position and engageable with the other abutment to move the window in the opposite direction, thereby to provide and close a ventilating opening between a vertical edge of the window and the adjacent runway, one of said abutments being movable into and out of the path of said member.

2. In a vehicle door having a window, a rail having a horizontal slot secured to the lower edge of the window, a regulator for raising and lowering said window including a pair of swinging arms one thereof having an element movable along said slot, a pair of horizontally spaced abutments on said rail, and a separate member movable with said last named arm and engageable with one abutment for moving the window edgewise when in raised position and engageable with the other abutment to move the window in the opposite direction, thereby to provide and close a ventilating opening between a vertical edge of the window and the adjacent runway, one of said abutments comprising a pivoted device movable into and out of the path of said member.

3. In a vehicle door having a window, a rail having a horizontal slot secured to the lower edge of the window, a regulator for raising and lowering said window including a pair of swinging arms one of said arms having an element movable along said slot, a pair of horizontally spaced abutments on said rail, a separate member movable with said last named arm and engageable with one abutment for moving the window edgewise when in raised position and engageable with the other abutment to move the window in the opposite direction, thereby to provide and close a ventilating opening between a vertical edge of the window and the adjacent runway, one of said abutments comprising a pivoted device movable into and out of the path of said member, and a lateral projection on said last named arm for controlling said device.

4. In a vehicle door having a window, a retainer having a horizontal slot secured to the lower edge of the window, regulator mechanism for raising and lowering said window including a pair of swinging arms one thereof having a stud movable in said slot, a pair of spaced abutments carried by said retainer, and a second stud carried by said last named arm and engageable with one of said abutments for moving the window horizontally in its plane in one direction when in raised position and engageable with the other of said abutments to move the window in the opposite direction, thereby to provide and close a ventilating opening at one upright edge of the window, one of said abutments being shiftable into and out of the path of said second stud.

GEORGE W. HOUSDORFER.